No. 737,022.

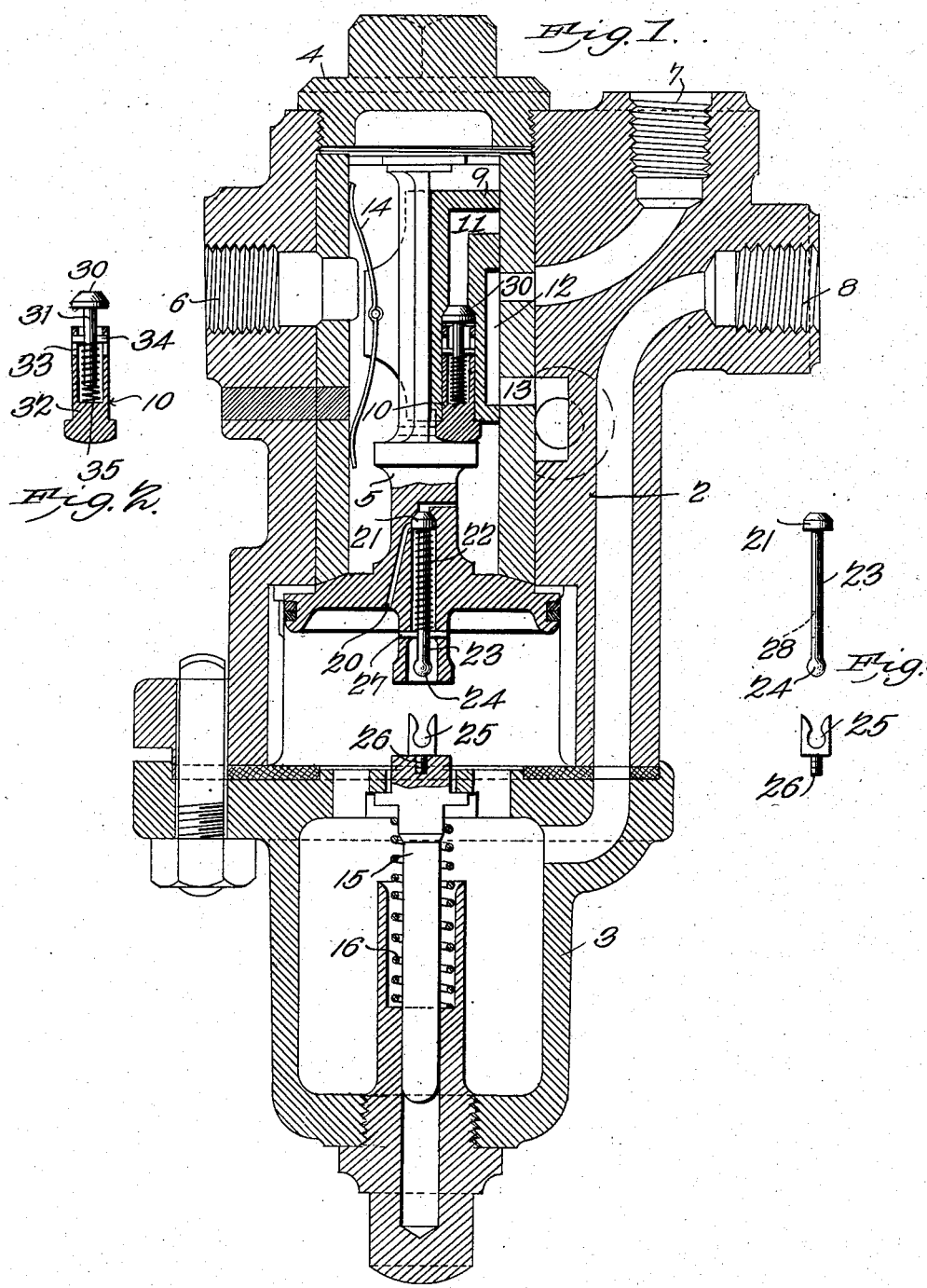

Patented August 25, 1903.

UNITED STATES PATENT OFFICE.

DAVID M. ROBINSON, OF GREENVILLE, TEXAS.

TRIPLE VALVE FOR AIR-BRAKES.

SPECIFICATION forming part of Letters Patent No. 737,022, dated August 25, 1903.

Application filed February 4, 1902. Serial No. 92,580. (No model.)

*To all whom it may concern:*

Be it known that I, DAVID M. ROBINSON, a citizen of the United States, residing at Greenville, in the county of Hunt and State of Texas, have invented a new and useful Triple Valve for Air-Brakes, of which the following is a specification.

My invention relates to certain improvements in air-brake systems, and has for its principal object to provide an improved form of triple valve whereby the auxiliary reservoir may be recharged without releasing the brakes.

With this and other objects in view the invention consists in the novel construction and combination of parts hereinafter described, illustrated in the accompanying drawings, and particularly pointed out in the appended claims.

In the drawings, Figure 1 is a sectional elevation of a triple valve arranged and constructed in accordance with my invention. Fig. 2 is a detail view of a form of graduating-valve which I employ. Fig. 3 is a similar view of the auxiliary valve and mechanism carried by the stem of the valve-piston.

Similar numerals of reference are employed to designate corresponding parts throughout the several figures of the drawings.

The triple valve illustrated in the drawings is of the Westinghouse type and comprises a valve-case 2, a lower case 3, a cap 4, and piston 5. The several ports or passages 6, 7, and 8 communicate, respectively, with the auxiliary reservoir, the brake-cylinder, and the train-pipe, the flow of air being governed by a slide-valve 9 and graduating-valve 10, the latter being of the construction more clearly shown in the detail view Fig. 2. The slide-valve 9 is provided with the usual port 11 for governing the flow of air from the auxiliary reservoir to the brake-cylinder and a port 12 for controlling the exhaust from the brake-cylinder to the exhaust-port 13. The usual slide-valve spring 14 is employed to retain the valve in position during the independent movement of the piston and graduating-valve. In the lower cap 3 is a graduating-stem 15, surrounded by a compression-spring 16 and adapted for contact with the stem of the piston.

In the operation of a triple valve of the ordinary construction a slight reduction of pressure in the train-pipe causes the greater pressure in the auxiliary reservoir to force the piston downwardly, closing the leakage-groove or feed-port and moving the graduating-valve 10 away from its seat in a port 11 until the shoulder at the upper end of the piston-stem engaging the slide-valve moves it, with the piston, until the latter is stopped by contact with the graduating-stem 15, the spring 16 resisting further movement. In this position the port 11 is opposite the port 7, leading to the brake-cylinder, and air from the auxiliary reservoir passes to the brake-cylinder and effects the application of the brakes. The pressure in the auxiliary reservoir having now been reduced by expansion into the brake-cylinder to an amount less than that in the train-pipe, the piston is forced up and moves the graduating-valve to its seat, retaining the pressure in the brake-cylinder. When the train-pipe pressure is increased, the piston is raised and moves the slide-valve to the position illustrated in the drawings, permitting the air in the brake-cylinder to exhaust and the pressure in the auxiliary reservoir being established gradually through the leakage-groove. To restore the pressure, the brakes must be released, and in the event of a second application being necessary there will not be sufficient pressure in the auxiliary reservoir for an immediate application owing to the length of time required to reëstablish the normal reservoir-pressure through the leakage-groove. It is the principal object of the present invention to recharge the auxiliary reservoir while the brakes are set, so that there may be sufficient pressure for an immediate application of the brakes when necessary. To effect this result, I provide in the piston 5 a port or passage 20, in which is seated a controlling-valve 21, normally held in closed position by a coiled spring 22, surrounding the stem 23 of the valve. The lower portion of the valve-stem is provided with an enlarged head 24, adapted for engagement in a socket 25, formed by a plurality of spring-fingers carried by the upper end of the graduating-stem. In the present case this socket may be formed of a block of metal suitably shaped to form a pair of oppositely-disposed fingers for the reception of the head 24 and provided with a threaded stem 26, adapted to a threaded recess in the upper end of the graduating-stem. The stem 23 of the valve 21 has a limited movement governed by a transverse pin 27, carried by the walls of the main piston-stem and extending through a slot 28 in the stem 23, as shown by dotted lines in Fig. 3.

The graduating-valve 10 in the ordinary construction is in the form of a solid cylindrical block secured to the piston-stem and movable therewith to open or close the passage from the auxiliary reservoir to the brake-cylinder. In carrying out my invention I employ a valve of the construction more clearly shown in Fig. 2 and comprising a valve-head 30, mounted on a stem 31, the latter being fitted within the recessed end of the valve-body 32, which is connected to the piston. The valve-body is provided with longitudinal slots 33 for the reception of a transverse pin 34, carried by the valve-stem and limiting the independent movement thereof, while the valve 30 is normally pressed against its seat by a coiled compression-spring 35, situated within the recessed valve-body and surrounding the valve-stem.

In the operation of a triple valve constructed in accordance with this invention the reduction of pressure in the train-pipe causes a downward movement of the piston, moving the graduating-valve to open position and permitting the flow of air from the auxiliary reservoir to the brake-cylinder. The downward movement of the piston causes the engagement of the valve-stem head 24 in the spring-socket 25, preventing further downward movement of the piston. When the reservoir-pressure has been reduced slightly below the pressure in the train-pipe, the piston will move upwardly to a distance sufficient to effect the closing of the graduating-valve, cutting off the flow of air from the auxiliary reservoir and setting the brakes. By slowly increasing the train-pipe pressure the piston will be moved upward to a slight extent against the resistance offered by the spring 22, the head 24 being still engaged in the socket 25 and holding the valve-stem down. This movement of the piston causes the valve-seat to leave the valve 21 and permits the flow of air through the port 20 into the auxiliary reservoir, the flow of air continuing until the pressure in the reservoir and train-pipe is equalized. This may be effected gradually and the auxiliary reservoir restored to maximum pressure while the brakes are set. The train-pipe pressure is then increased with what is known as "excess" pressure, causing the disengagement of the head 24 and the spring-socket 25 and permitting the upward movement of the piston and the movement of the slide-valve to release position, permitting the exhaust of the air in the brake-cylinder. By this means there will always be sufficient pressure in the auxiliary reservoir to permit of a second application of the brakes immediately after the brakes have been released.

The construction is such that the invention may be applied to triple valves in ordinary use with but slight expense and without any alteration in the construction of the main valve members.

While the construction herein described and illustrated in the accompanying drawings is the preferred form of the device, it is obvious that various changes in the form, proportions, size, and minor details of the structure may be made without departing from the spirit or sacrificing any of the advantages of my invention.

Having thus described my invention, what I claim is—

1. In a device of the class specified, a triple-valve piston having a port for the passage of air from the train-pipe to the auxiliary reservoir, a valve in said port, and means for maintaining the valve in open position to permit the recharging of the auxiliary reservoir while the brakes are set.

2. In a device of the class specified, a triple-valve piston having a port for the passage of air from the train-pipe to the auxiliary reservoir, a valve in said port, and means for mechanically locking said valve in open position to permit the recharging of the auxiliary reservoir while the brakes are set.

3. In a device of the class specified, a piston having a port for the passage of air from the train-pipe to the auxiliary reservoir, a valve in said port, a graduating-stem, and means for temporarily locking the valve to the graduating-stem, substantially as specified.

4. In a device of the class specified, a triple valve having a piston and a graduating-stem, a valved port or passage in the piston, a spring tending to move said valve to the closed position, and means for temporarily locking the valve to the graduating-stem, thereby to permit the opening of the port or passage and the flow of air therethrough to the auxiliary reservoir.

5. In a device of the class specified, a triple valve having a ported piston, a spring-pressed valve in said port, and means for mechanically locking and temporarily holding said valve in open position to permit the flow of air from the train-pipe to the auxiliary reservoir, said valve being released by the inward movement of the piston under excess pressure in the train-pipe.

6. In a device of the class specified, a triple valve having a ported piston and a graduating-stem, a valve for closing said port, a valved stem having an enlarged head, a spring surrounding the valve-stem and tending to move the valve to the closed position, and a spring-socket carried by the graduating-stem for engagement with said enlarged head.

7. In a device of the class specified, a triple valve having a ported piston and a graduating-stem, a valve for closing said port, a valve-stem carrying said valve and having an enlarged head, a pin carried by the stem of the piston and adapted to a slotted opening in the valve-stem, a spring surrounding said valve-stem and tending to maintain the valve in closed position, and a plurality of spring-fingers carried by the graduating-stem and forming a socket for engagement with the enlarged head of the valve-stem, substantially as specified.

8. In a device of the class specified, a triple valve having a ported piston, a slide-valve and a graduating-stem, a spring-pressed valve disposed in the piston-port, means for temporarily locking said valve to the graduating-stem, a graduating-valve disposed in the slide-valve and comprising a valve-body secured to the piston-stem, a valve independent of said valve-body, and a spring disposed between the valve and valve-body and tending to maintain the valve in closed position.

In testimony that I claim the foregoing as my own I have hereto affixed my signature in the presence of two witnesses.

DAVID M. ROBINSON.

Witnesses:
JNO. T. CRADDOCK,
C. A. LEDDY.